US012202393B2

United States Patent
Yu et al.

(10) Patent No.: US 12,202,393 B2
(45) Date of Patent: Jan. 21, 2025

(54) HEADREST SLIDING DEVICE

(71) Applicants: HYUNDAI MOTOR COMPANY, Seoul (KR); KIA CORPORATION, Seoul (KR); SEOYONCNF, Ulsan (KR)

(72) Inventors: Sang Uk Yu, Seoul (KR); Tae Hoon Lee, Suwon-si (KR); Sang Ho Kim, Incheon (KR); Seung Young Lee, Seoul (KR); Jun Namgoong, Asan-si (KR); Yong Jun Shin, Ulsan (KR)

(73) Assignees: HYUNDAI MOTOR COMPANY, Seoul (KR); KIA CORPORATION, Seoul (KR); SEOYONCNF, Ulsan (KR)

( * ) Notice: Subject to any disclaimer, the term of this patent is extended or adjusted under 35 U.S.C. 154(b) by 117 days.

(21) Appl. No.: 18/117,051

(22) Filed: Mar. 3, 2023

(65) Prior Publication Data

US 2024/0140288 A1 May 2, 2024

(30) Foreign Application Priority Data

Oct. 26, 2022 (KR) .......................... 10-2022-0138824

(51) Int. Cl.
*B60N 2/865* (2018.01)
*B60N 2/80* (2018.01)
*B60N 2/809* (2018.01)

(52) U.S. Cl.
CPC ............. *B60N 2/865* (2018.02); *B60N 2/809* (2018.02); *B60N 2002/899* (2018.02)

(58) Field of Classification Search
CPC .......... B60N 2/02246; B60N 2002/899; B60N 2/809; B60N 2/865; B60N 2/829
See application file for complete search history.

(56) References Cited

U.S. PATENT DOCUMENTS

| 9,718,381 | B2* | 8/2017 | Yoo | B60N 2/806 |
| 10,160,361 | B2* | 12/2018 | Little | B60N 2/02246 |
| 10,500,997 | B2* | 12/2019 | Maloney | B60N 2/829 |
| 2004/0262974 | A1* | 12/2004 | Terada | B60N 2/865 |
| | | | | 297/407 |

FOREIGN PATENT DOCUMENTS

DE 102012025191 B3 * 1/2014 ........... B60N 2/0276

* cited by examiner

*Primary Examiner* — Milton Nelson, Jr.
(74) *Attorney, Agent, or Firm* — MCDONNELL BOEHNEN HULBERT & BERGHOFF LLP (57) ABSTRACT

An electric headrest sliding device includes a slider configured to be movable upwards and downwards by driving of a motor, a front frame of a headrest, and a rotation link configured to connect the slider to the front frame, wherein the rotation link is rotated forwards or rearwards to push or pull the front frame during upward-and-downward movement of the slider, thereby accurately adjusting the front and rear positions of the headrest.

14 Claims, 8 Drawing Sheets

HEADREST SLIDING DEVICE

CROSS REFERENCE TO RELATED APPLICATIONS

This application claims, under 35 U.S.C. § 119(a), the benefit of priority from Korean Patent Application No. 10-2022-0138824, filed on Oct. 26, 2022, the entire contents of which are incorporated herein by reference.

BACKGROUND

(a) Technical Field

The present disclosure relates to a headrest sliding device. More particularly, it relates to an electric headrest sliding device configured to adjust the front and rear positions of a headrest by sliding the headrest in a forward-and-rearward direction.

(b) Background Art

In general, a vehicle seat includes a seat cushion configured to support the occupant's buttocks when an occupant is seated, a seatback configured to support the occupant's back and lower back, and a headrest configured to support the occupant's neck and head.

The height of the headrest may be adjusted by inserting a stay connected to the lower portion of the headrest into the seatback or withdrawing the stay from the inside of the seatback, and the forward-and-rearward angle of the headrest may be adjusted by any angle adjustment mechanism.

However, when the angle of the headrest is adjusted, the area in which the occupant's head contacts the headrest may be reduced, and an occupant may feel uncomfortable. Further, the occipital portion of the occupant is not completely supported by the headrest, thereby increasing the risk of injury to the occupant in the event of vehicle collision.

In order to solve these problems, proposed is a headrest forward-and-rearward driving mechanism configured to adjust the front and rear positions of the headrest depending on the position of the occupant's head.

A headrest forward-and-rearward driving mechanism of the related art includes a motor, a lead screw, and an X-shaped link in which two links are cross-linked in an X-shape. When the X-shaped link is implemented by rotation of the lead screw according to driving of the motor, the X-shaped link pushes a front frame of the headrest forwards, thereby making it possible to adjust the front and rear positions of the headrest.

However, in the headrest forward-and-rearward driving mechanism of the related art, when the X-shaped link is implemented around the axis of rotation, a gap between the two links constituting the X-shaped link occurs excessively, which may cause not only an error in adjusting the front and rear positions of the headrest but also noise and deterioration in quality.

The above information disclosed in this Background section is only for enhancement of understanding of the background of the disclosure, and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide an electric headrest sliding device including a slider configured to be linearly movable upwards and downwards by driving of a motor, a front frame of a headrest, and a rotation link configured to connect the slider to the front frame. Here, the rotation link is rotated forwards or rearwards to push or pull the front frame during upward-and-downward movement of the slider, thereby making it possible to perform stable and accurate adjustment of the front and rear positions of the headrest.

In one aspect, the present disclosure provides a headrest sliding device including a rear frame connected to a stay, a motor mounted on the rear frame, the motor having a lead screw connected to an output part thereof, a slider coupled to the lead screw and disposed in front of the rear frame to be movable upwards and downwards, a front frame coupled to a front portion of the rear frame so as to be movable forwards and rearwards, and a rotation link rotatably coupled to the rear frame and configured to connect the slider to the front frame.

In a preferred embodiment, the slider may include a body part having a screw hole formed at a front portion thereof and configured to allow the lead screw to be inserted thereinto, the body part having rotation link connection grooves respectively formed on opposite side surfaces thereof and connected to the rotation link, and elevating guide wings formed to respectively extend from upper ends of the body part in opposite directions and coupled to the rear frame to be movable upwards and downwards.

In another preferred embodiment, each of the elevating guide wings may have an elevating guide hole formed therein, and a vertical guide pin inserted into the elevating guide hole may be mounted at each of opposite positions of a front surface of the rear frame.

In still another preferred embodiment, the front surface of the rear frame may have a fixing block protruding therefrom, wherein an upper end and a lower end of the vertical guide pin may be respectively coupled and fixed to the fixing block.

In yet another preferred embodiment, the rotation link may include a rotation support rotatably coupled to the rear frame by a rotation shaft, a first rotation bar extending rearwards from the rotation support and inserted into and connected to a rotation link connection groove of the slider, and a second rotation bar extending forwards from the rotation support and connected to the front frame.

In still yet another preferred embodiment, the rear frame may have a rotation shaft connection block protruding from a front surface thereof and disposed at each of opposite positions thereof, wherein the rotation shaft inserted into the rotation support may be rotatably connected to the rotation shaft connection block.

In a further preferred embodiment, the first rotation bar may have a first rotation pin formed at an end thereof, wherein the first rotation pin may be inserted into and coupled to the rotation link connection groove of the slider.

In another further preferred embodiment, the front frame may have a rotation guide groove formed in each of opposite portions thereof, wherein the rotation guide groove may allow a second rotation pin to be inserted thereinto, and to be rotatable and movable upwards and downwards therein, wherein the second rotation pin may be formed at an end of the second rotation bar of the rotation link.

In still another further preferred embodiment, when the rotation link is rotated forwards, the second rotation bar may push the front frame forwards and the second rotation pin may be positioned at an upper portion of the rotation guide groove.

In yet another further preferred embodiment, when the rotation link is rotated rearwards, the second rotation bar may pull the front frame rearwards and the second rotation pin may be positioned at a lower portion of the rotation guide groove.

In still yet another further preferred embodiment, the front frame may have horizontal guide pins respectively mounted at four corner positions on a rear surface thereof in order to guide forward-and-rearward movement of the front frame, and the rear frame may have horizontal guide holes formed therein, wherein the horizontal guide pins may be respectively inserted into the horizontal guide holes so as to be movable forwards and rearwards.

In a still further preferred embodiment, the rear frame may have a stay coupling block formed on a rear surface thereof, the stay coupling block having the stay inserted thereinto and coupled thereto.

In a yet still further preferred embodiment, a spring may connect the front frame to the rear frame, wherein the spring may exert elastic restoring force when the front frame is moved rearwards.

Other aspects and preferred embodiments of the disclosure are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to the exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 1:
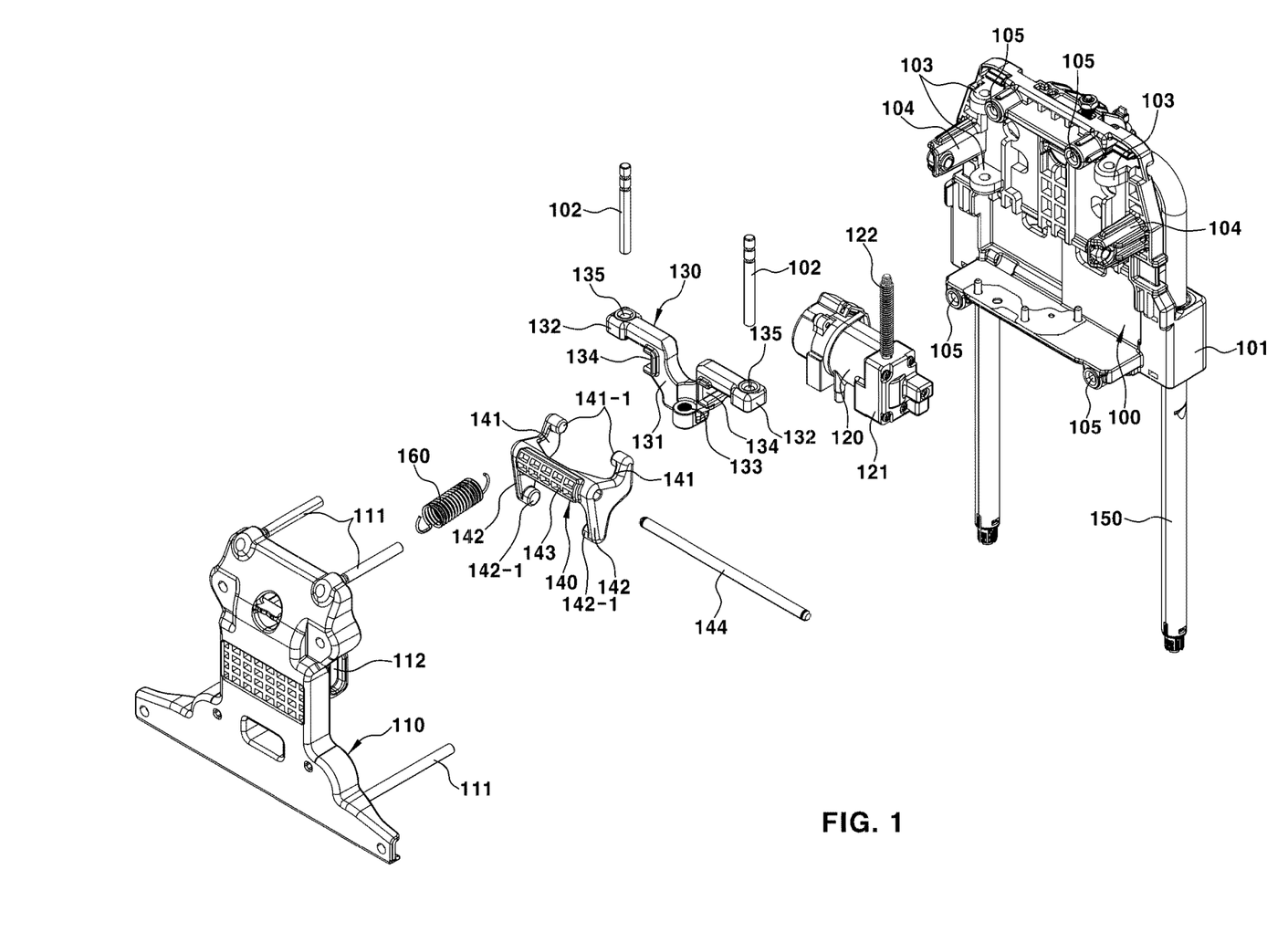
FIG. 1 is an exploded perspective view showing a headrest sliding device according to the present disclosure.

FIG. 1 is an exploded perspective view showing a headrest sliding device according to the present disclosure, FIGS. 2, 3, 4, and 5 are perspective views sequentially showing the assembly sequence of the headrest sliding device according to the present disclosure, and reference numeral 100 in each drawing denotes a rear frame.

The rear frame 100 is a skeleton disposed inside a headrest and is connected to a stay 150 configured to adjust the height of the headrest.

To this end, a stay coupling block 101 having the stay 150 inserted thereinto and coupled thereto is formed on the rear surface of the rear frame 100.

The lower portion of the stay 150 inserted into and coupled to the stay coupling block 101 of the rear frame 100 may be vertically inserted into a seatback (not shown).

Accordingly, the stay 150 is inserted into the seatback or withdrawn from the inside of the seatback, thereby adjusting the height of the headrest.

Figure 2:
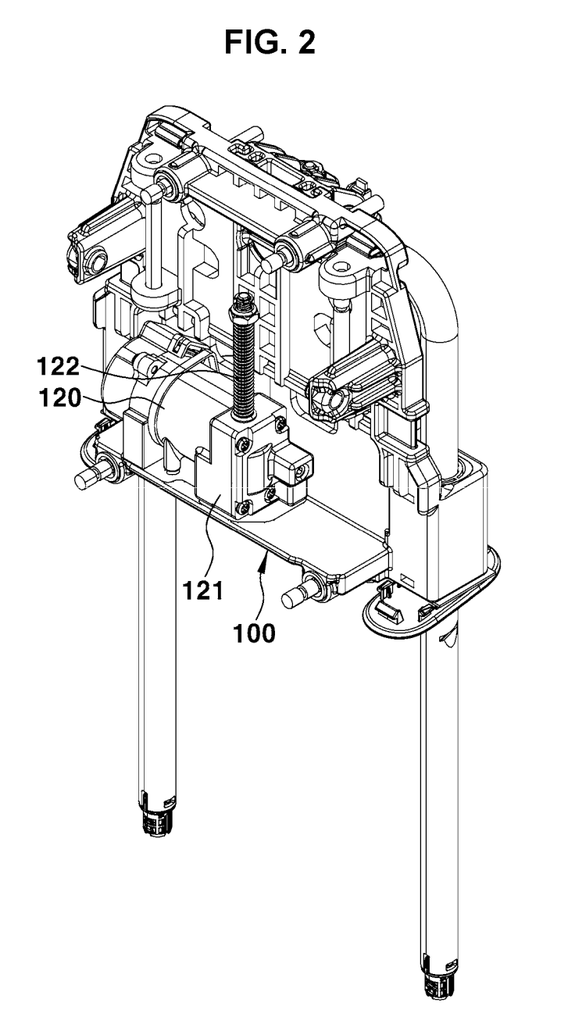
FIGS. 2, 3, 4, and 5 are perspective views showing the assembly sequence of the headrest sliding device according to the present disclosure.

Referring to FIG. 2, first, a motor 120 is mounted on the lower side of the front portion of the rear frame 100, and a lead screw 122, which is an output shaft, is connected to a gearbox 121 of the motor 120 and is disposed in an upward direction.

Figure 3:
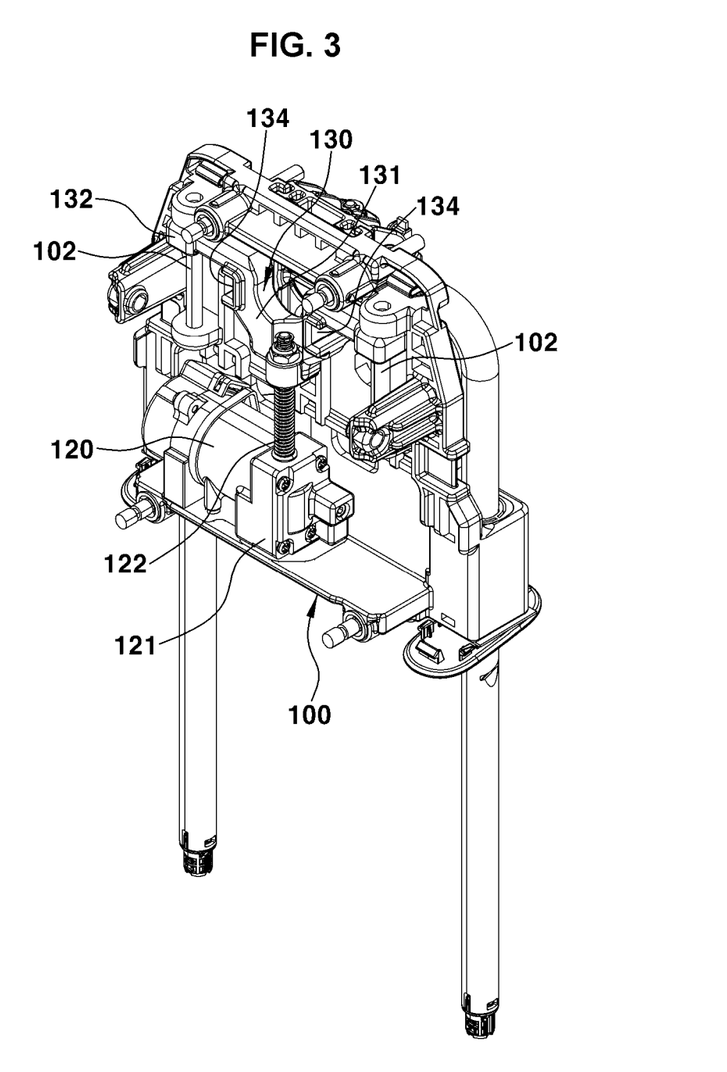

Next, as shown in FIG. 3, a slider 130 coupled to the lead screw 122 is disposed in front of the rear frame 100 to be movable upwards and downwards.

The slider 130 may include a body part 131 having the lead screw 122 inserted thereinto and coupled thereto and a pair of elevating guide wings 132 coupled to the rear frame 100 to be movable upwards and downwards.

In more detail, a screw hole 133 having the lead screw 122 inserted thereinto and coupled thereto is formed at the front portion of the body part 131 of the slider 130, and rotation link connection grooves 134 connected to a rotation link 140 are respectively formed on opposite sides of the body part 131.

In addition, the elevating guide wings 132 respectively extend from the upper ends of the body part 131 in opposite directions and are coupled to the rear frame 100 to be movable upwards and downwards.

To this end, each of the elevating guide wings 132 has an elevating guide hole 135 formed therein, and a vertical guide pin 102 inserted into the elevating guide hole 135 is mounted at each of the opposite positions of the front surface of the rear frame 100.

Preferably, a fixing block 103 to which the upper and lower ends of the vertical guide pin 102 are respectively coupled and fixed is formed to protrude from the front surface of the rear frame 100.

Here, in the state in which the lead screw 122 is inserted into and coupled to the screw hole 133 of the body part 131 and the vertical guide pin 102 is inserted into the elevating guide hole 135 of the elevating guide wing 132, when the lead screw 122 is rotated in place in one direction or the other direction according to driving of the motor 120, the upward-and-downward movement of the slider 130 may be easily performed.

Figure 4:
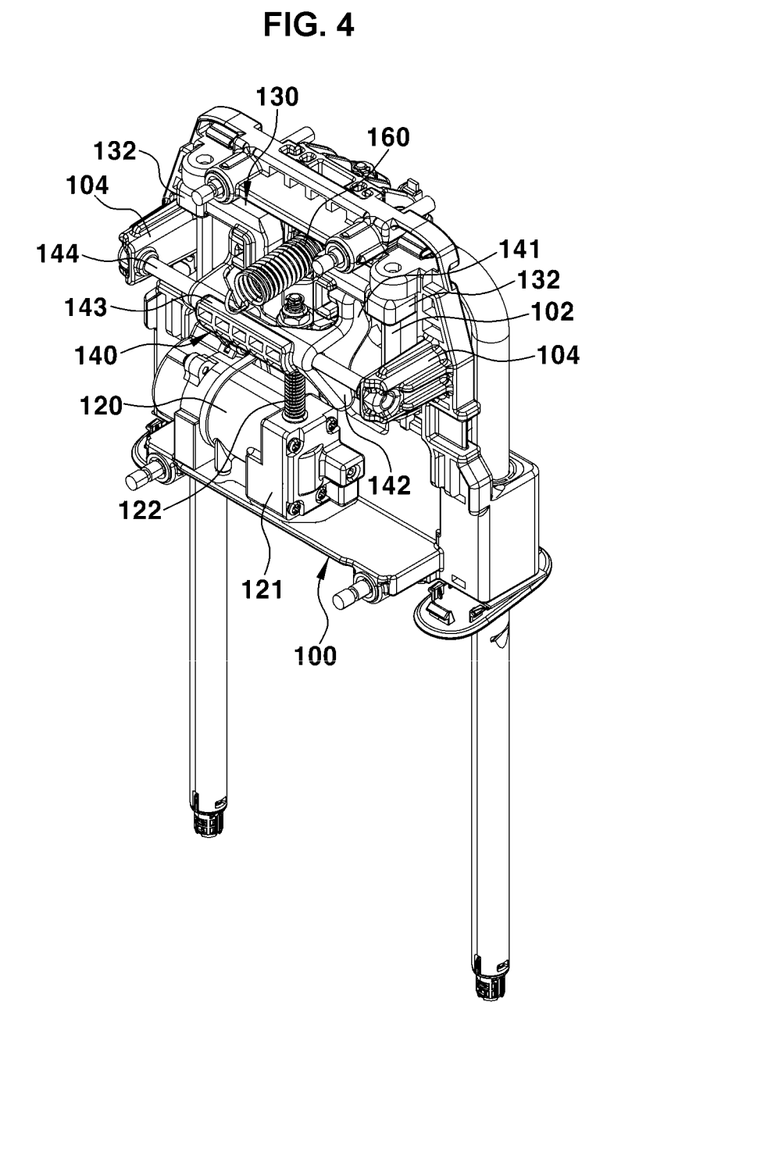

Then, as shown in FIG. 4, the rotation link 140 is rotatably coupled to the rear frame 100.

The rotation link 140 may include a rotation support 143 rotatably coupled to the rear frame 100 by a rotation shaft 144, a first rotation bar 141 formed to extend rearwards from each of the opposite ends of the rotation support 143 and inserted into and connected to the rotation link connection groove 134 of the slider 130, and a second rotation bar 142 formed to extend forwards from each of the opposite ends of the rotation support 143 and connected to a front frame 110.

Here, the rear frame 100 has a rotation shaft connection block 104 formed to protrude from the front surface thereof and disposed at each of the opposite portions thereof, wherein each of the opposite ends of the rotation shaft 144 inserted into the rotation support 143 is rotatably connected to a corresponding one of the rotation shaft connection blocks 104.

Preferably, the rotation shaft connection block 104 of the rear frame 100 having the rotation shaft 144 connected thereto is formed to protrude farther forwards than the fixing block 103 of the rear frame 100 having the vertical guide pin 102 coupled and fixed thereto, and as such, the rotation link 140 may be rotatably disposed around the rotation shaft 144 at a front position of the rear frame 100 while avoiding interference with the lead screw 122.

In addition, a first rotation pin 141-1 rotatably formed at the end of the first rotation bar 141 of the rotation link 140 is inserted into the rotation link connection groove 134 formed in the body part 131 of the slider 130.

Here, in the state in which the first rotation pin 141-1 of the first rotation bar 141 of the rotation link 140 is inserted into the rotation link connection groove 134 formed in the body part 131 of the slider 130, the slider 130 presses the first rotation bar 141 in the downward direction when the same is linearly moved in the downward direction. Accordingly, the rotation link 140 may be rotated forwards around the rotation shaft 144.

On the other hand, when the slider 130 is linearly moved in the upward direction, the same pulls the first rotation bar 141 in the upward direction. Accordingly, the rotation link 140 may be rotated rearwards around the rotation shaft 144.

Figure 5:
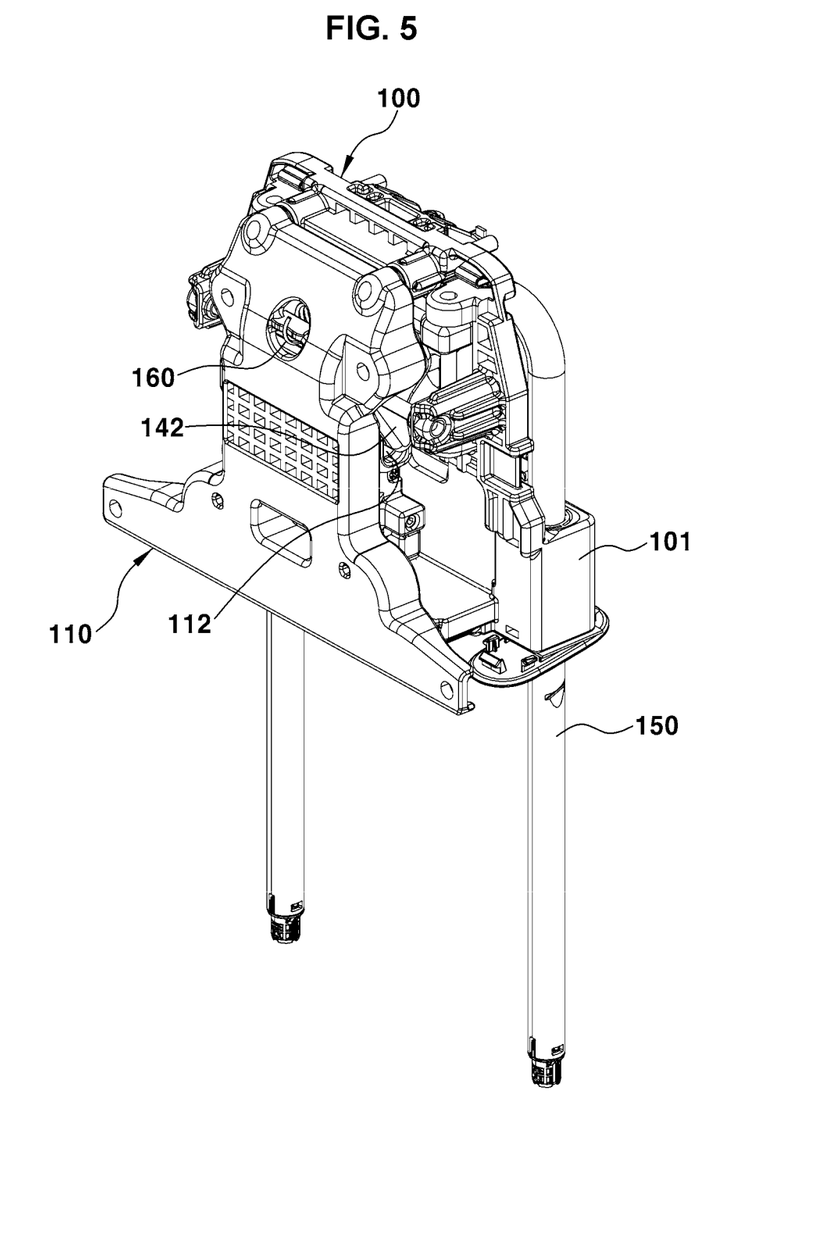

Further, as shown in FIG. 5, the front frame 110 is coupled to the front portion of the rear frame 100 so as to be movable forwards and rearwards.

To this end, one or more horizontal guide pins 111 having a predetermined length are mounted at four corner positions on the rear surface of the front frame 110 to guide the forward-and-rearward movement of the front frame 110, and the rear frame 100 has one or more horizontal guide holes 105 formed therein, wherein the one or more horizontal guide pins 111 are respectively inserted into the one or more horizontal guide holes 105 so as to be movable forwards and rearwards.

Accordingly, when the front frame 110 is moved forwards, the horizontal guide pin 111 comes out of the horizontal guide hole 105 of the rear frame 100, and when the front frame 110 is moved rearwards, the horizontal guide pin 111 is inserted into the horizontal guide hole 105 of the rear frame 100, thereby reliably performing the straight movement of the front frame 110.

Meanwhile, the rotation link 140 is rotatably coupled to the rotation shaft connection block 104 of the rear frame 100 by the rotation shaft 144, and connects the slider 130 to the front frame 110.

To this end, the front frame 110 has a rotation guide groove 112 formed in each of the opposite portions thereof and elongated in the vertical direction, and the second rotation bar 142 of the rotation link 140 is inserted into and coupled to the rotation guide groove 112 so as to be rotatable and movable upwards and downwards.

In this case, a second rotation pin 142-1 rotatably formed at the end of the second rotation bar 142 is inserted into and coupled to the rotation guide groove 112 so as to be rotatable and movable upwards and downwards.

Accordingly, when the slider 130 is linearly moved in the downward direction as described above, the same presses the first rotation bar 141 in the downward direction, and the rotation link 140 is rotated forwards around the rotation shaft 144. Further, when the rotation link 140 is rotated forwards, the second rotation bar 142 pushes the front frame 110 forwards and the second rotation pin 142-1 of the second rotation bar 142 is positioned at the upper portion of the rotation guide groove 112.

On the other hand, when the slider 130 is linearly moved in the upward direction, the same pulls the first rotation bar 141 in the upward direction, and the rotation link 140 is rotated rearwards around the rotation shaft 144. Further, when the rotation link 140 is rotated rearwards, the second rotation bar 142 pulls the front frame 110 rearwards and the second rotation pin 142-1 of the second rotation bar 142 is positioned at the lower portion of the rotation guide groove 112.

Meanwhile, a spring 160 having tensile performance connects the rear surface of the front frame 110 to the front surface of the rear frame 100.

Accordingly, when the front frame 110 is moved forwards, the spring 160 is extended, and when the front frame 110 is moved rearwards, elastic restoring force of the spring 160 acts, thereby making it possible to reliably perform the rearward movement of the front frame 110.

Hereinafter, a description will be given as to the operation flow of the headrest sliding device of the present disclosure having the above-described configuration.

Figure 7:
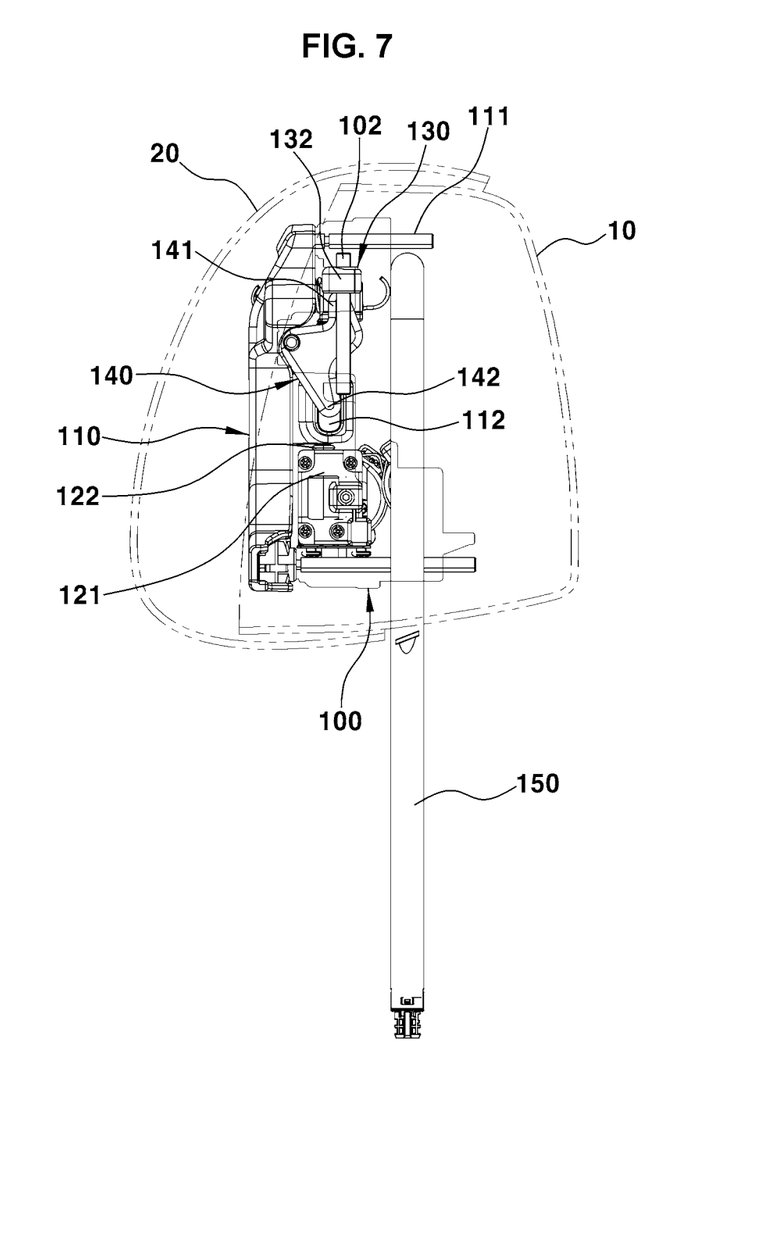
FIG. 7 is a side view showing the state in which the front frame of the headrest sliding device according to the present disclosure is moved rearwards.

FIGS. 5 and 7 show the state in which the front frame of the headrest sliding device according to the present disclosure is moved rearwards.

When the lead screw 122 is rotated in place in one direction according to driving of the motor 120, the lead screw 122 is inserted into and coupled to the screw hole 133 formed in the body part 131 of the slider 130, and the vertical guide pin 102 is inserted into the elevating guide hole 135 of the elevating guide wing 132. Accordingly, the headrest sliding device may be raised to the maximum rising position of the slider 130.

In this case, in the state in which the first rotation pin 141-1 of the first rotation bar 141 of the rotation link 140 is inserted into and coupled to the rotation link connection groove 134 formed in the body part 131 of the slider 130, the slider 130 pulls the first rotation bar 141 upwards when the same is linearly moved upwards. Accordingly, the rotation link 140 may be rotated rearwards around the rotation shaft 144.

In addition, in the state in which the second rotation pin 142-1 of the second rotation bar 142 of the rotation link 140 is inserted into and coupled to the rotation guide groove 112 of the front frame 110, when the rotation link 140 is rotated rearwards, the second rotation bar 142 may pull the front frame 110 rearwards, and simultaneously, the second rotation pin 142-1 may be positioned at the lower portion of the rotation guide groove 112.

Here, when the second rotation bar 142 pulls the front frame 110 rearwards, the horizontal guide pin 111 of the front frame 110 is inserted into the horizontal guide hole 105 of the rear frame 100. Accordingly, the rearward movement of the front frame 110 may be easily performed, and the front frame 110 may be linearly moved in the rearward direction.

In this manner, the front frame 110 may be moved rearwards up to a position desired by an occupant, and as such, the position of the headrest configured to support the rear portion of the head of the occupant may be easily adjusted rearwards up to the position desired by the occupant.

Figure 6:
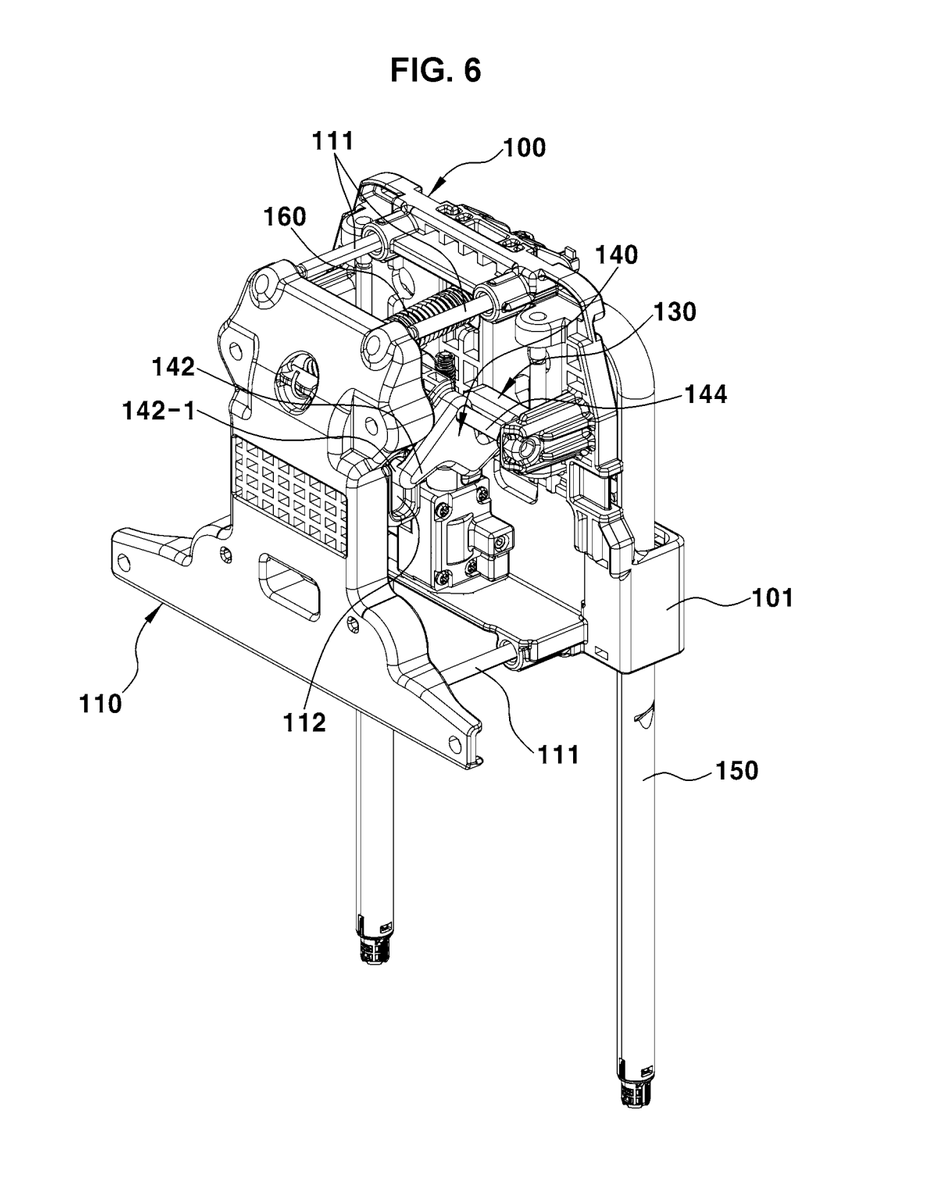
FIG. 6 is a perspective view showing the state in which a front frame of the headrest sliding device according to the present disclosure is moved forwards.
Figure 8:
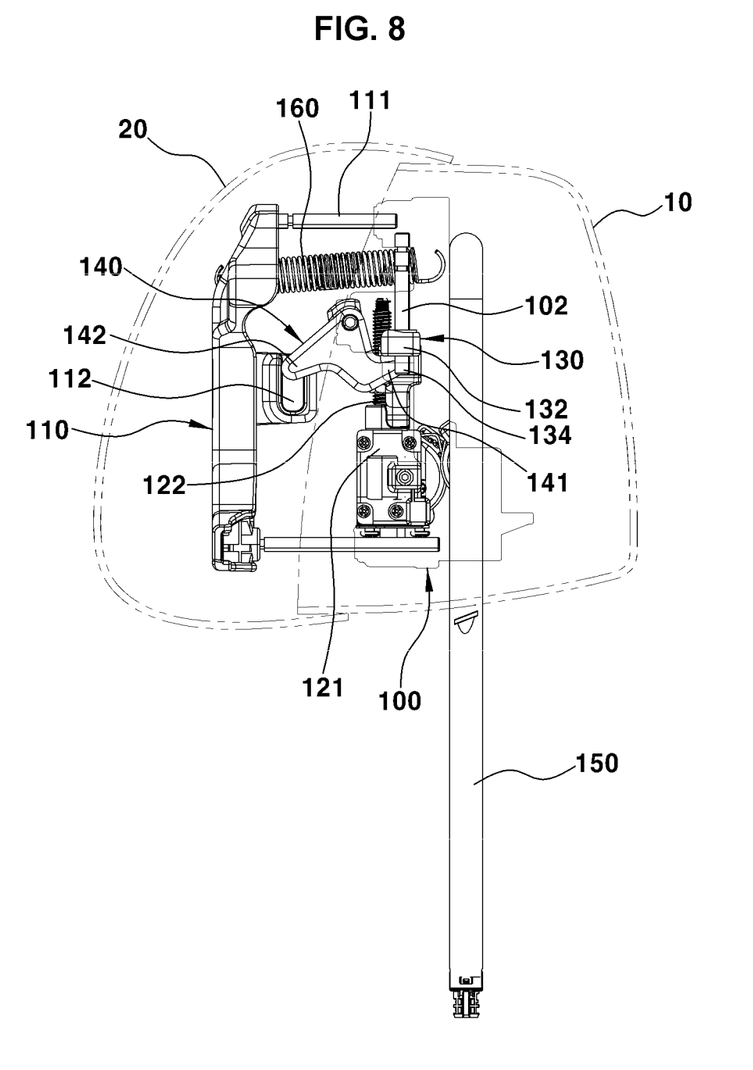
FIG. 8 is a side view showing the state in which the front frame of the headrest sliding device according to the present disclosure is moved forwards.

FIGS. 6 and 8 show the state in which the front frame of the headrest sliding device according to the present disclosure is moved forwards.

When the lead screw 122 is rotated in place in the other direction according to driving of the motor 120, the lead screw 122 is inserted into and coupled to the screw hole 133 formed in the body part 131 of the slider 130, and the vertical guide pin 102 is inserted into the elevating guide hole 135 of the elevating guide wing 132. Accordingly, the headrest sliding device may be lowered to the maximum descending position of the slider 130.

In this case, in the state in which the first rotation pin 141-1 of the first rotation bar 141 of the rotation link 140 is inserted into and coupled to the rotation link connection groove 134 formed in the body part 131 of the slider 130, the slider 130 presses the first rotation bar 141 downwards when the same is linearly moved downwards. Accordingly, the rotation link 140 may be rotated forwards around the rotation shaft 144.

In addition, in the state in which the second rotation pin 142-1 of the second rotation bar 142 of the rotation link 140 is inserted into and coupled to the rotation guide groove 112 of the front frame 110, when the rotation link 140 is rotated forwards, the second rotation bar 142 may pull the front frame 110 forwards, and simultaneously, the second rotation pin 142-1 may be positioned at the upper portion of the rotation guide groove 112.

Here, when the second rotation bar 142 pulls the front frame 110 forwards, the horizontal guide pin 111 of the front frame 110 exits the horizontal guide hole 105 of the rear frame 100. Accordingly, the forward movement of the front frame 110 may be easily performed, and the front frame 110 may be linearly moved in the forward direction.

In this manner, the front frame 110 may be moved forwards up to a position desired by an occupant, and as such, the position of the headrest configured to support the rear portion of the head of the occupant may be easily adjusted forwards up to the position desired by the occupant.

Meanwhile, as shown in FIGS. 7 and 8, a front headrest cover 20 having a headrest foam (not shown) provided therein may be attached to the front frame 110, a rear headrest cover 10 having a headrest foam (not shown) provided therein may be attached to the rear frame 100, and the rear end of the front headrest cover 20 may be disposed to slidably overlap the front end of the rear headrest cover 10.

Accordingly, when the front frame 110 is moved forwards and rearwards, the front headrest cover 20 is also moved forwards and rearwards, and as such, the rear portion of the head of an occupant may be substantially closely supported by the front headrest cover 20.

As described above, when the slider 130 is linearly moved upwards and downwards by driving of the motor 120 and simultaneously rotates the rotation link 140 forwards or rearwards, the rotation link 140 is caused to push or pull the front frame 110, thereby making it possible to accurately perform adjustment of the front and rear positions of the headrest without any gap or error.

As is apparent from the above description, a headrest sliding device of the present disclosure provides the following effects.

First, when a slider is linearly moved upwards and downwards by driving of a motor and simultaneously rotates a rotation link forwards or rearwards, the rotation link pushes or pulls a front frame, thereby accurately performing adjustment of the front and rear positions of a headrest without any gap or error.

Second, since the front and rear positions of the headrest are adjusted depending on the position of the occupant's head, the rear portion of the head of the occupant is completely supported by the headrest, thereby providing the occupant with comfort and improving occupant convenience.

Third, since the rear portion of the head of the occupant is closely supported by the headrest, it is possible to reduce the risk of neck injury to the occupant in the event of vehicle collision.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and equivalents thereto.

The invention claimed is:
1. A headrest sliding device comprising:
   a rear frame connected to a stay;
   a motor mounted on the rear frame, the motor having a lead screw connected to an output part of the motor;
   a slider coupled to the lead screw and positioned in front of the rear frame, the slider being configured to move up and down;
   a front frame coupled to a front portion of the rear frame, the front frame being configured to move forwards and rearwards; and
   a rotation link rotatably coupled to the rear frame, and configured to connect the slider to the front frame.

2. The headrest sliding device of claim 1, wherein the slider comprises:
   a body part having a screw hole formed at a front portion of the body part and configured to receive the lead screw, the body part having rotation link connection grooves formed on opposite side surfaces of the body part, and the rotation link connection grooves being connected to the rotation link; and
   elevating guide wings extending from upper ends of the body part in opposite directions, and coupled to the rear frame, the elevating guide wings being configured to move up and down.

3. The headrest sliding device of claim 2, wherein each of the elevating guide wings has an elevating guide hole, and a vertical guide pin inserted into each of the elevating guide holes is mounted at each of opposite positions of a front surface of the rear frame.

4. The headrest sliding device of claim 3, further comprising a fixing block protruding from the front surface of the rear frame, wherein an upper end and a lower end of each of the vertical guide pins are coupled and fixed to the fixing block.

5. The headrest sliding device of claim 1, wherein the rotation link comprises:
   a rotation support rotatably coupled to the rear frame by a rotation shaft;
   a first rotation bar extending from the rotation support and inserted into and connected to a rotation link connection groove of the slider; and
   a second rotation bar extending from the rotation support and connected to the front frame.

6. The headrest sliding device of claim 5, further comprising a rotation shaft connection block protruding from a front surface of the rear frame and disposed at each of opposite positions, wherein the rotation shaft inserted into the rotation support is rotatably connected to the rotation shaft connection block.

7. The headrest sliding device of claim 5, further comprising a first rotation pin formed at an end of the first rotation bar, wherein the first rotation pin is inserted into and coupled to the rotation link connection groove of the slider.

8. The headrest sliding device of claim 5, wherein the front frame has a rotation guide groove formed in each of opposite portions of the front frame, wherein each of the rotation guide grooves allow a second rotation pin to be inserted into each of the rotation guide grooves, and to be rotatable and movable upwards and downwards within the rotation guide grooves, wherein the second rotation pin is formed at an end of the second rotation bar of the rotation link.

9. The headrest sliding device of claim 8, wherein, when the rotation link is rotated forwards, the second rotation bar pushes the front frame forwards and the second rotation pin is positioned at an upper portion of the rotation guide groove.

10. The headrest sliding device of claim 8, wherein, when the rotation link is rotated rearwards, the second rotation bar pulls the front frame rearwards and the second rotation pin is positioned at a lower portion of the rotation guide groove.

11. The headrest sliding device of claim 1, wherein the front frame has one or more horizontal guide pins mounted at four corner positions on a rear surface of the front frame, wherein the one or more horizontal guide pins are inserted into the rear frame to guide forward and rearward movement of the front frame.

12. The headrest sliding device of claim 11, wherein the rear frame has one or more horizontal guide holes, wherein the one or more horizontal guide pins are inserted into the one or more horizontal guide holes to be movable forwards and rearwards.

13. The headrest sliding device of claim 1, wherein the rear frame has a stay coupling block formed on a rear surface of the rear frame, wherein the stay is inserted into and coupled to the stay coupling block.

14. The headrest sliding device of claim 1, wherein a spring connects the front frame to the rear frame, wherein the spring exerts elastic restoring force when the front frame is moved rearwards.

* * * * *